United States Patent [19]

Imhof et al.

[11] Patent Number: 6,013,320
[45] Date of Patent: Jan. 11, 2000

[54] CONTINUOUS PROCESS FOR METALLIZING POROUS SYNTHETIC SUBSTRATES EMPLOYING A WET-CHEMICAL METHOD

[75] Inventors: Otwin Imhof, Nuertigen, Germany; Holger Kistrup, Esslingen, Denmark; Uwe Schaffrath, Korbach, Germany

[73] Assignees: Deutsche Automobilgesellschaft MBH; Daug-Hoppecke Gesellschaft fur Batteriesysteme MBH, both of Germany

[21] Appl. No.: 08/889,152

[22] Filed: Jul. 7, 1997

[51] Int. Cl.⁷ ......................................................... B05D 3/04
[52] U.S. Cl. .......................... 427/304; 427/306; 427/307; 427/350; 427/443.1
[58] Field of Search ..................................... 427/304, 306, 427/307, 350, 443.1

[56] References Cited

U.S. PATENT DOCUMENTS

| Re. 30,061 | 7/1979 | Shepherd | 156/78 |
| 4,201,825 | 5/1980 | Ebneth | 428/263 |

FOREIGN PATENT DOCUMENTS

| 36 31 055 | 9/1986 | Germany . |
| 36 37 130 | 10/1986 | Germany . |
| 37 10 895 | 4/1987 | Germany . |
| 38 43 903 | 12/1988 | Germany . |
| 39 25 232 | 7/1989 | Germany . |
| 40 33 518 | 10/1990 | Germany . |
| 39 14 726 | 11/1990 | Germany . |
| 42 42 443 | 12/1992 | Germany . |

*Primary Examiner*—Brian K. Talbot
*Attorney, Agent, or Firm*—Evenson, McKeown, Edwards & Lenahn, P.L.L.C.

[57] ABSTRACT

The invention relates to a process for the continuous chemical metallizing of porous substrates in a wet-chemical manner. According to the invention, the different reaction rates of the adsorption or ionic reduction reaction, in the case of activating with Pd/Sn, are adapted to the chemical metallizing reaction used. The removal of the spent process solutions from the pores of the substrate takes place by suction. The invention permits a continuous implementation of the process of depositing a metal layer on an electrically non-conductive, synthetic substrate, which can be used at the start of a galvanic reinforcing process of the chemically deposited metal coating.

12 Claims, No Drawings

CONTINUOUS PROCESS FOR METALLIZING POROUS SYNTHETIC SUBSTRATES EMPLOYING A WET-CHEMICAL METHOD

This application claims the priority of German patent application 19627413.3–45, filed Jul. 8, 1996, the disclosure of which is expressly incorporated herein by reference.

BACKGROUND AND SUMMARY OF THE INVENTION

The invention relates to a process for the wet-chemical metallizing of porous synthetic substrates.

The porous synthetic substrates of the type addressed here consist of a plurality of fibers, which are woven to one another, glued to one another or otherwise appropriately connected with one another. Alternatively, the porous substrates are formed of walls of open, mutually communicating pores. Porous synthetic substrates of this type are used for filtering, insulating or for various collecting or retaining purposes. Polyolefins, polyamides, polyesters, polyphenylene sulfides, or other polymers can be used as the basic substrate materials as porous nonwovens, open-pore foams, or woven felts.

For many technical applications, coating the electrically non-conductive fiber surfaces or pore wall surfaces with a thin metal layer is recommended. This can take place by means of physical processes, such as the depositing of physical vapor (PVD) or chemical vapor (CVD) or by wet-chemical methods. In a wider sense, the invention relates to the wet-chemical metallizing of fiber surfaces or pore wall surfaces of porous substrates.

The wet-chemical metal depositing normally provides that the surface of the porous synthetic substrate:

first be correspondingly conditioned, which can take place, for example, by etching, by roughening as the result of glow discharge, by partially dissolving, by coating with a hydrophilic substance, among other methods;

subsequently, a precious-metal-containing, catalytically active compound is deposited on the conditioned surface, for which a Pd/Sn-compound is frequently used; however, in principle, silver compounds or platinum compounds can also be used; and finally, after the removal of the spent activating solution, which contains catalytically active particles, from the pores of the porous substrate, the activated surface of the fibers or pores is brought in contact with a metallizing solution and thereby is chemically metallized.

Relevant literature concerning the state of the art is found, for example, in the publication "Kunststoff-Galvanisierung" ("Electrometallizing Plastics"), "Handbuch fuer Theorie und Praxis" ("Manual for Theory and Practice"), Leuze Publishers, Saulgau/Wuertt.), or in citations from German patent literature, such as German Patent Documents DE 39 25 232 C2, DE 36 31 055 C2, DE 40 33 518 C2, DE 42 42 443 C2, DE 38 43 903 C2, DE 39 14 726 C2, DE 37 10 895 C2 or DE 36 37 130 C2.

From the above-mentioned state of the art, metallizing conditioned nonwoven, woven felt or opened-pored foam webs, involves saturating with an activating solution, preferably one based on Pd/Sn; then removing the spent activating solution from the pores of the porous substrate; and finally a chemical metallizing solution is brought in contact with the substrate surface. Preferably, copper and nickel are deposited as the metals; however, other metals can naturally also be deposited. As required, the chemically deposited metal layer can subsequently be reinforced galvanically with the same or a different metal.

Because of their fundamentally different individual functions, the individual process steps, specifically, the conditioning, the activating, the removal of the spent activating solution from the pores of the substrate, the chemical metallizing, the removal of the spent metallizing solution from the pores of the substrate, and applicable rinsing operations for removing salt or metal residue from the chemical metallizing solution from the pores of the substrate, have different limitations for the process as a whole, such as a limitation on reaction times.

The conditioning for imparting hydrophilic characteristics to the fiber or pore wall, for example, by saturating with a wetting agent and letting a wetting agent evaporate, may, under certain circumstances, take hours.

Activating with an acidic, freshly produced activating solution, based on Pd/Sn, takes between 5 and 15 minutes.

Removing spent activating solution from the pores of the substrate, depending on the porosity, takes 15 to 20 minutes.

Coating the activated fiber surfaces or pore wall surfaces with a metal layer takes 20 to 30 minutes. And rinsing with inflow water takes 2 minutes.

Finally, the mechanical removal of the rinsing water, at substrate porosities of 45 to 95%, takes another 15 to 20 minutes.

A complete successive linking of these different process steps into a uniformly continuous metallizing process, for porous substrates with starting porosities of from 45 to 95%, has not been implemented because of the different treatment times required. German Patent Document DE 41 06 696 C2, in the manner of a starting point, that is, for a partial activation, shows a possibility of a continuous method of operation. There—as customary—the conditioning of the substrate surface is included in the manufacturing process of the porous substrate. According to the state of the art, the porous substrate webs are continuously activated by means of a Pd/Sn-solution in a so-called one-step process. The continuous process sequence is limited to only saturating with an activating solution followed by a two-step drying process. The subsequent chemical metallizing is again carried out in batch quantities. Thus, only a part of the different process steps needed for wet-chemical metallizing of porous substrate webs is carried out in a continuous manner. Difficulties occur also as the result of the high-expenditure of time and effort and the two-step removal of the spent activating solution from the pores of the substrate. A two-step removal is used because the carried-through air quantities charged with hydrochloric acid particles can be detoxified only in a laborious, second step.

In the case of the state of the art, the removal of the spent metallizing solution from the pores, and the rinsing operations that must follow, cannot easily be included in a continuous sequence of the overall metallization process. In addition, control of hot-air drying requires high expenditures of time and effort in order to avoid local migration effects of catalytically ineffective $Pd^{2+}$. Once the continuous process sequence of the metallizing operation is interrupted in favor of a batch-type mechanical removal of spent metallizing solution or for rinsing water from the pores of the substrates, additional subsequent steps are required. This results in increased handling expenditures and higher labor cost.

The invention provides a more effective process for metallizing porous substrate webs made of a non-conductive synthetic material. The process is amenable to continuous operation, without interruptions, so that an entire metallizing function is performed.

The invention comprises the mutual coordination of the reaction rates during the activating and the chemical metallizing steps. The targeted selection and combination of the parameters of the activating solution and of the metallizing solution and of the intermediate removal of the respective spent reaction solutions from the pores of the porous substrate, as a whole, permits a continuous method of operation. Thus, the substrate may advance through all treatment stations, which performs all the steps of metallizing, in a uniform speed. Because of the invention, continuously operating and low-cost chemical metallizing can be implemented on an industrial scale with relatively low control requirements, low regulating expenditures, and low labor costs.

The surprising aspect of the invention is the fact that, while the process solutions, specifically the activating solution and the metallizing solution, are uniformly charged to the surface of the fibers or pores along the thickness of the material, it is possible to adapt the reactions to allow uniform reaction times at each step. The adsorptive activation, by means of precious-metal-containing (Pd/Sn) activating solutions, and the chemical metallization (nickel-plating, copper-plating or similar methods) occur at different reaction rates. However, by adapting the parameters of these reactions, for example selecting a concentration or a specific type of active substance, as well as an appropriate temperature for each reaction or step, a uniform time at each step in the process can be determined. Thus, modifying parameters with respect to the reaction rate for each step allows the substrate web to be guided continuously through no more than six stations. Simultaneously, the mechanically stressful suction to remove the spent process solutions is included in the process sequence.

The invention provides a process for the wet-chemical metallizing of porous substrates. Generally, the substrates have porosities of between 45 and 95% and comprise a non-conductive synthetic material, such as woven felts, nonwovens, or open-pored foams. In the process, the fiber surfaces or pore walls of the substrate are first activated by means of a Pd/Sn-containing activating solution. The activated surfaces are then metallized by means of a metallizing solution and are finally rinsed and freed of rinsing water. Furthermore, the invention involves hydrophilic or hydrophilized substrates being guided at an advancing speed, which is the same for all treatment stations, as a cohesive web and in a continuous process sequence, through a succession of treatment stations that result in a metallized substrate. The treatment stations comprise the steps of:

saturating the substrate with a Pd/Sn activating solution;

removing the spent activating solution;

saturating the substrate with a chemical metallizing solution;

removing the spent chemical metallizing solution;

washing the substrate with water; and removing the water.

The dwelling time of the substrates in the respective treatment stations can be optimized or varied depending on a number of parameters. A short saturating step can be compensated by the selection of the treatment liquid, specifically the concentration and/or the temperature. Selecting the treatment liquid allows an acceleration of the reaction in such a manner that, because of the reaction times actually implemented in a treatment station, continuous passage of the substrate is permitted. Generally, the spent treatment liquids, specifically the activating solution, the chemical metallizing solution, and the adhering rinsing water, are removed by suction from the pores of the porous substrate.

In specific embodiments, a nickel-plating solution is used as the chemical metallizing solution, which in addition to a dissolved nickel salt, contains only a chemical reduction agent but no additional electrolytes, such as pH-regulators, completing agents, or other stabilizers. To accelerate the metallizing reaction, the metallizing solution can be heated to a temperature of approximately 60° C.

In another embodiment, the rate of the activating reaction is accelerated by raising the temperature of the activating solution to 30 to 35° C.

In further embodiments, the invention provides nickel-plated substrates made by the chemical metallizing processes, as well as other Substrates made by the processes, and metallizing solutions employed in the processes.

Although the invention has been described and illustrated in detail, it is to be clearly understood that the same is by way of illustration and example, and is not to be taken by way of limitation. The spirit and scope of the present invention are to be limited only by the terms of the appended claims.

DESCRIPTION OF PREFERRED EMBODIMENTS

According to the invention, the substrate to be metallized, as a cohesive web, passes continuously through treatment stations in a successive manner so that treatments are carried out in a successive sequence. It is surprising that in each of the treatment stations the respective treatment parameters can be selected in a targeted manner, can be combined, and can be mutually adapted such that a continuous process is permitted. As a result, a small number of individual process steps suffice for an effective and complete wet-chemical metallization process. A surprisingly simple and comprehensive process was found which has reduced control and regulating requirements. According to the invention, a porous substrate of the initially described specification, which is hydrophilic, or was made hydrophilic passes through the following six stations:

a saturation station comprising an activating solution based on a Pd/Sn solution, a station that removes the spent activating solution, a saturation station comprising a chemical metallizing solution, a station that removes the spent chemical metallizing solution, a water wash station, and a station that removes the washing water.

The substrate passes these six stations continuously, at a specified advancing speed. According to the invention, various parameters can be modified to achieve a continuous process. Each of the following may be suitably optimized or modified:

the concentration of the solution components, the temperature of the activating and/or metallizing solution, the type of the activating solution used or the extent of activation of the fiber surface or pore wall surface of the porous substrate.

As one example, the Pd/Sn-containing activating solution acts upon the surface and the thickness of the substrate in a uniform manner with respect to time. That time can be adapted to a time that results in a substantially effective chemical metallization using a selected metallization solution. An important aspect of the invention consists of the fact that hydrophilized porous substrates for wet-chemical metallizing can be guided through activating stations and chemical metallizing stations at the same advancing speed. This is surprisingly achieved by synchronizing the time at each of the individual steps required by adjusting the treatment parameters in individual treatment stations. The individual type reaction selected, such as the adsorption, the reduction reaction of a higher order with an accompanying, catalytically initiated hydrogen development, can also influence the time at each station. Thus, the parameters that influence the course of stations selected can be correspondingly expanded.

An important aspect of the invention is also the fact that the low adherence of the catalytically active particles on the activated substrate surface and the low adherence of the excess metallizing solution on the chemically deposited metal skin make it possible to suck off the spent, precious metal-containing activating solution and the spent chemical metallizing solution after those respective stations. The removal of the spent solutions out of the pores of the substrate occurs without any damage to the metal skin. For example, the breaking-out of dried and broken metal tinsels is prevented. This promotes a continuous development of the whole metallizing process as contemplated in the invention.

Preferably, the time in the chemical metallizing solution can be adapted by the rise in temperature and the elimination of complexing agents and/or pH-stabilizers within the continuous process as a whole. Thus, preferred embodiments provide that the chemical metallizing solution selected contains no complexing agents, pH-regulators, or similar agents. Also, the chemical metallizing solution is selected as one with a reaction rate amenable to the reaction sequence, including the precious metal-containing activating of the substrate surface, only by adjusting the temperature. Including a required washing operation, the inventive process requires only six individual process steps. These steps are applied continuously to the uniformly advancing substrate in order to arrive, from a hydrophilic or hydrophilized substrate surface, at a chemically metallized substrate surface, which can be directly reinforced galvanically.

In principle, the preferred types of activation correspond to those used in the art, specifying an activation by means of a colloidal palladium/tin solution (Pd/Sn). As known, chemical metallization frequently uses a nickel-plating reaction, which can also be applied in the present case and is preferred. However, it was found here that by eliminating conventional complexing agents, or pH-regulators, a chemical metallizing solution is obtained only by dissolving a nickel salt (hydrate of chloride) and a reducing agent (for example, hypophosphite). This chemical metallizing solution can be heated (for example, to 60° C. ) without any damage and can therefore be used for the metallizing reaction according to the invention and. As a result, this metallizing reaction permits a speed-coordinated, continuous method of operation of the different types of treatment.

The suction system for the spent process solutions should be designed with respect to its suction capacity and/or suction time. Various devices known in the art can be employed. Functionally, the suction systems results in a residual moisture of only approximately 3%.

Other objects, advantages and novel features of the present invention will become apparent from the following detailed description of the invention.

EXAMPLE

A woven felt substrate made of polypropylene (PP) having a fiber thickness of 20 $\mu$m, a porosity of 93% and a nominal thickness of 3 mm was guided, in the web-shaped condition produced by manufacturing and with a hydrophilizing fiber finish, at an advancing speed of 3 m/min continuously through the following stations:

Station 1: Saturation by means of a matured, Pd/Sn-containing activating solution by a targeted refilling of fresh activating solution in a pool in the area of the immersed substrate and guiding the saturated felt to the next station. The activating solution contained 0.2 g Palladium(II)-chloride, 0.8 g Tin(II)-chloride dihydrate, and 0.9 g concentrated hydrochloric acid (density 1.19 g/ccm) per liter and is ready for use after maturing approximately 50 minutes at a temperature of 28° C. following mixing. Other appropriate solutions are known in the art. The 28° C. temperature was selected for the solution in this station.

Station 2: Sucking off the activating solution from the pores of the substrate by means of a pump by way of nozzles.

Station 3: Saturation of the activated substrate by means of a chemical nickel-plating solution, which contains only dissolved nickel chloride hexahydrate and sodium hypophosphite, brought to a temperature of 60° C., and guiding to the next station. The chemical nickel-plating solution contained 40 g nickel chloride hexahydrate and 56 g sodium hypophosphite monohydrate per liter. Other appropriate solutions are known in the art.

Station 4: Sucking off the reacted-out metallizing solution from the pores of the substrate by means of a pump by way of nozzles.

Station 5: Saturation of the chemically metallized substrate by means of washing water.

Station 6: Sucking the water out of the metallized and washed substrate.

For producing the vacuum for sucking off solutions in Stations 2, 4, and 6 above, a liquid ring pump with fitted broad slit jets was employed. Examples of pumps that may be used include those available from: Friedrichsfeld AG Department Pumps, located in Mannheim, Germany; W. Hedrich, Vakuumanlagen GmbH & Co. KG, for vacuum systems, located in Ehringshausen, Germany; and Sihi-Halberg, for liquid ring pumps, located in Itzehoe, Germany.

As a result, a uniformly metallized, porous woven felt web was obtained whose metal deposit on the fibers could be arbitrarily reinforced galvanically.

Further examples can be designed where, if desired, an identical washing and suction process is added to station 5–6 or, the washing of metallization residue from the pores is eliminated from stations 5–6, without departing from the scope of the invention. Accordingly, the exact number and order of stations employed to carry out the process of the invention can be varied.

We claim:

1. A continuous process for the wet-chemical metallizing of porous substrates, consisting of the steps of:

activating the substrate by bringing it into contact with an activating solution comprising a Pd/Sn solution at a selected temperature and selecting the concentration of the components of the activating solution to allow substantially optimum metallization of the substrate;

removing the spent activating solution;

wet-chemical metallizing the activated substrate by bringing it into contact with a metallizing solution and selecting the concentration of the components of the metallizing solution to allow substantially optimum metallization of the substrate;

removing the spent chemical metallizing solution;

saturating the metallized substrate with water; and removing the water, wherein the substrate has a porosity of between about 45% and about 95% and comprises a non-conductive synthetic material, and wherein each of the steps is incorporated into a single station so that the substrate proceeds through each station sequentially.

2. A continuous process for the wet-chemical metallizing of porous substrates, consisting of the steps of:

activating the substrate by bringing it into contact with an activating solution comDrising a Pd/Sn solution and selecting the temperature of the activating solution to allow substantially optimum metallization of the substrate;

removing the spent activating solution;

wet-chemical metallizing the activated substrate by bringing it into contact with a metallizing solution and selecting the temperature of the metallizing solution to allow substantially optimum metallization of the substrate;

removing the scent chemical metallizing solution;

saturating the metallized substrate with water; and removing the water, wherein the substrate has a porosity of between about 45% and about 95% and comprises a non-conductive synthetic material, and wherein each of the steps is incorporated into a single station so that the substrate proceeds through each station sequentially.

3. A continuous process for the wet-chemical metallizing of porous substrates, consisting of the steps of:

activating the substrate by bringing it into contact with an activating solution comprising a Pd/Sn solution at a selected temperature;

removing the spent activating solution;

wet-chemical metallizing the activated substrate by bringing it into contact with a metallizing solution at a selected temperature;

removing the spent chemical metallizing solution;

saturating the metallized substrate with water; and removing the water, wherein the substrate has a porosity of between about 45% and about 95% and comprises a non-conductive synthetic material, and wherein each of the steps is incorporated into a single station so that the substrate proceeds through each station sequentially.

4. A continuous process as claimed in claim 3, wherein the length of time the substrate is in contact with the activating solution is substantially the same as the time the substrate is in contact with the metallizing solution.

5. A continuous process as claimed in claim 3, wherein any of the steps of removing spent activating solution, removing spent metallizing solution, or removing water, employs a suction device.

6. A process according to claim 3, wherein the metallizing solution comprises a nickel-plating solution.

7. A process according to claim 6, wherein the nickel-plating solution lacks additional electrolytes, pH-regulator compounds, complexing agents, and other stabilizers.

8. A process according to claim 7, wherein the temperature of the metallizing solution is approximately 60° C.

9. A process according to claim 3, wherein the temperature of the activating solution is approximately 30 to 35° C.

10. A process according to claim 6, wherein the temperature of the activating solution is approximately 30 to 35° C.

11. A process according to claim 7, wherein the temperature of the activating solution is approximately 30 to 35° C.

12. A process according to claim 8, wherein the temperature of the activating solution is approximately 30 to 35° C.

* * * * *